United States Patent
Murty

[11] Patent Number: 5,877,227
[45] Date of Patent: Mar. 2, 1999

[54] LOW DENSITY FLEXIBLE POLYURETHANE FOAMS

[75] Inventor: Vabilisetti S. Murty, Bloomfield Hills, Mich.

[73] Assignee: Imperial Chemical Industries PLC, Millbank, England

[21] Appl. No.: 909,110

[22] Filed: Aug. 11, 1997

[51] Int. Cl.$^6$ .................................................. C08G 18/04

[52] U.S. Cl. ......................... 521/159; 521/160; 521/170; 521/174

[58] Field of Search .................................. 521/159, 160, 521/170, 174

[56] References Cited

U.S. PATENT DOCUMENTS

| | | |
|---|---|---|
| 2,834,748 | 5/1958 | Bailey et al. . |
| 2,917,480 | 12/1959 | Bailey et al. . |
| 3,505,377 | 4/1970 | Morehouse . |
| 3,741,417 | 6/1973 | Blankenship . |
| 3,887,483 | 6/1975 | Morehouse . |
| 3,905,924 | 9/1975 | Prokai . |
| 3,952,038 | 4/1976 | Prokai . |
| 3,980,688 | 9/1976 | Litteral . |
| 4,003,847 | 1/1977 | Prokai . |
| 4,025,452 | 5/1977 | Nnadi . |
| 4,071,493 | 1/1978 | Begou . |
| 5,663,272 | 9/1997 | Slack et al. . |

*Primary Examiner*—John M. Cooney, Jr.

[57] ABSTRACT

The present invention is directed to a low density flexible polyurethane foam and the process of making the same from a polyisocyanate composition and an isocyanate reactive composition wherein the polyisocyanate composition comprises a semi-prepolymer which is the reaction product of an excess of a base isocyanate formulation with a polyoxyethylene polyol, said base isocyanate formulation comprising a mixture of diphenylmethane diisocyanate and polyphenylpolymethylene polyisocyanate, said diphenylmethane diisocyanate comprising, inter alia, 2, 4'-MDI in prescribed amounts, whereby the functionality of the base isocyanate formulation ranges from 2.07 to 2.12 and said isocyanate reactive composition comprises water, a second polyoxyethylene polyol, a cross-linker and catalyst.

26 Claims, No Drawings

LOW DENSITY FLEXIBLE POLYURETHANE FOAMS

The present invention relates to water-blown flexible polyurethane foams having low compression set, good mechanical properties and good processing characteristics.

BACKGROUND OF THE INVENTION

Polyurethane foams formed by the reaction of a polyisocyanate with a polyhydroxyl-containing compound in the presence of a suitable catalyst are widely accepted as padding materials for cushions in furniture, automobiles and the like.

Polyurethane foam formulations typically require a blowing agent to generate the gas to fill and expand the polyurethane foam cells. The resultant density of a polyurethane foam is controlled by the quantity and efficiency of the blowing agents. While carbon dioxide may be generated as a blowing agent through the reaction of water with the polyisocyanate, the use of low-boiling inert liquids, in particular, chlorofluorocarbons (CFCs), to augment or replace the chemical blowing action, has led to certain property advantages in the final foams, such as improved softness and higher elasticity.

However, the CFCs used as blowing agents and for other purposes are now suspected to be linked to the depletion of ozone in the upper atmosphere where the generally inert CFCs are decomposed by ultraviolet light. To avoid this potential problem, polyurethane foams blown only with carbon dioxide have acquired renewed interest.

Flexible polyurethane foams have been manufactured for more than thirty years from organic polyisocyanates and polymeric polyol using water as the primary blowing agent. Until recently, the polyisocyanate most commonly used in the production of flexible foams has been tolylene diisocyanate (TDI), but recent years have seen an increasing use of diphenylmethane diisocyanates (MDI), especially 4,4'-MDI, 2,4'-MDI, 2,2' MDI and polymers thereof.

However, water blown flexible polyurethanes produced heretofore have problems associated therewith affecting the stability thereof. These problems need to be overcome in order to produce a useful product. For example, the use of carbon dioxide generated from the reaction of water with isocyanate as a sole blowing agent necessitates formulations containing relatively large amounts of water to obtain low density foam grades; this increase in water makes the foam unstable.

One method of making the foam more stable is to increase high functionality ($f \geq 3$) polyisocyanate oligomers of the MDI series in the polyisocyanate composition during processing. These higher functionality oligmers ("polymeric MDI" oligomers) produce much crosslinking in the molecular structure of the foam polymer. This helps prevent the foam from collapsing or recessing during rise. The need for this stabilization increases as the foam density decreases. Unfortunately, the added crosslinking detracts from desired mechanical properties and processing characteristics of MDI flexible foam. It causes the foam system to build viscosity faster and gel earlier in the reaction profile (i.e., at lower % conversion of —NCO groups)—thereby hindering the ability of the reacting system to "flow". Poor flow causes difficulties in filling complex molds, especially at low foam densities. The added crosslinking also reduces ultimate elongation and tear strength of the final foams.

The foams can also be made stable by increasing the EO ("ethylene oxide") content of the polyols in the isocyanate reactive composition. However, this increases compression sets, produces tight foams and reduces flow. Yet another way to stabilize the polyurethane foam is via the use of highly potent surfactants. However, this would result in poor fatigue, low resilences and high compression sets.

It is therefore the object of the present invention to develop a low density flexible polyurethane foam which does not suffer from the problems discussed hereinabove.

It is additionally an object of the invention to achieve stability (in low density systems) with reduced crosslinking, in particular, by using lower levels of the higher functionality ($f \geq 3$) "polymeric MDI" oligomers in the polyisocyanate component. This object is directed primarily to all-MDI based, all-water blown (CFC free) flexible foams of densities less than 3.0 PCF, but greater than 1.6 PCF.

Another object of the invention is to achieve improved mold flow (mold filling ability) without increasing mold residence time. This object must be achieved within the design limits of two-component foam processing machines now in wide use.

Yet another object is to improve physical properties such as elongation and tear strength of the foams, without compromising other important physical properties, such as compression-set resistance.

SUMMARY OF THE INVENTION

Accordingly, the present invention is directed to a flexible open celled polyurethane foam prepared by contacting under effective reaction conditions a polyisocyanate composition with an isocyanate reactive composition in the presence of water as the sole blowing agent characterized in that (a) the polyisocyanate composition comprises a semi-prepolymer which is the reaction product of an excess of a base isocyanate formulation with a first polyoxypropylene polyoxyethylene polyol, wherein said first polyol is present in the polyisocyanate composition in an amount ranging from about 5% to less than 50% by weight, based upon the total weight of the base isocyanate, and has a nominal functionality of 2–4, a molecular weight ranging from about 1,000 to about 8,000 and an ethylene oxide content of about 0 to about 30 weight percent, and said base isocyanate formulation comprises a mixture of diphenylmethane diisocyanate and polyphenyl polymethylene polyisocyanate, said diphenylmethane diisocyanate comprising 2,4'-MDI in an amount ranging from 21% to 35% by weight, 4,4'-MDI in an amount ranging from 63% to 79% by weight and 2,2'-MDI in an amount ranging from 0% to 2% by weight, the functionality of the base isocyanate formulation ranging from 2.07 to 2.12, and (b) the isocyanate reactive composition comprises:
  (1) Polyol A which is a second polyoxypropylene polyoxyethylene polyol which may be the same or different from said first polyol having a nominal functionality of 2–4, a molecular weight ranging from about 2,000 to about 8,000 and an oxyethylene content of about 5% to 30% by weight; and
  (2) water in an amount ranging from about 2.5% to about 7.0% by weight relative to Polyol A;
  (3) a crosslinker present in crosslinking effective amounts; and
  (4) a catalyst in an amount effective to catalyze the reaction of said isocyanate reactive composition and said polyisocyanate composition, wherein said polyurethane foam has a gel time ranging from about 15 to about 40 sec, and has a minimum mold residence time without incurring damage to the foam of about 1.5 minutes to about 3.0 minutes.

The present invention is also directed to a process for preparing the polyurethane foam and to the reaction system comprising the polyisocyanate composition and the isocyanate reactive composition.

DETAILED DESCRIPTION OF THE PRESENT INVENTION

An aspect of the present invention is the process for preparing a low density polyurethane foam from a polyisocyanate composition and isocyanate reactive composition described hereinabove. By reducing the amount of polymeric MDI (i.e., the $f \geq 3$ oligomers) in the isocyanate such that the number average functionality of the base isocyanate is within the limits specified hereinabove and simultaneously increasing the amount of 2,4'-MDI to meet the limits specified herein in the process described hereinabove, a low density polyurethane foam is produced which has excellent physical characteristics, such as high stability, high resilience, high tear strength, excellent compression set resistance, excellent elongation properties, excellent flow characteristics and the like. These properties make the low density polyurethane foams produced by the present invention ideal for use as, for example, padding material for cushioning in furniture, automobile seats, and the like.

As used herein, the term "A side" refers to the polyisocyanate composition, while the "B side" refers to the isocyanate reactive composition.

As used herein, the term "base isocyanate" formulation" refers to the MDI diisocyanates (4,4'-MDI, 2,4'-MDI, 2,2'-MDI isomers) and the polyphenyl polyisocyanates which preferably are the higher oligomers of the MDI series (f=3 and higher) in the proportions used to formulate the polyisocyanate component of the flexible foam reaction systems of the present invention. This definition excludes the presence of any polyol therein.

The term "polymethylene polyphenylene polyisocyanate", as used herein refers to the molecular structure:

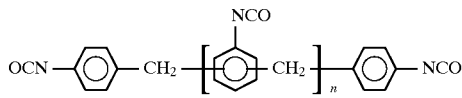

shown above wherein the value of n ranges from 1 to approximately 10. The NCO functionality of each oligomer is n+2 (i.e., f=3 or higher).

The expression "diphenylmethane diisocyanate" refers to MDI diisocyanate and the isomers thereof, e.g., 4,4'-MDI, 2,4'-MDI, and 2,2'-MDI, and the like.

The term "MDI functionality", as used herein is the number average isocyanate functionality of all diphenylmethane diisocyanates and all polymethylene polyphenylene polyisocyanates used in preparing the polyisocyanate composition according to the present invention with the proviso that the NCO groups used in the preparation of the semi-prepolymer are also taken into account in determining this functionality.

The formula for calculating the functionality (number average) of the base isocyanate formulation, (Fn), as used in the practice of this invention is:

$$Fn = \frac{\frac{P(Di)}{EW(Di)} + \frac{P(Olig)}{EW(Olig)}}{\frac{P(Di)}{MW(Di)} + \frac{P(Olig)}{MW(Oilg)}}$$

wherein:
P(Di) is the amount by weight of the diphenylmethane diisocyanate used to make the final isocyanate composition.
P(Olig) is the amount by weight of the base isocyanate formulation containing higher ($f \geq 3$) MDI series oligomers used to make the final isocyanate composition.
EW(di) is the isocyanate (—NCO) equivalent weight of the diphenylmethane diisocyanate. This number is 125 for MDI diisocyanates.
EW(Olig) is the isocyanate (—NCO) equivalent weight of the base diisocyanate formulation containing the higher oligomers. This is itself a number average value calculated from the known composition of the base isocyanate formulation containing the higher oligomers, or it may be measured analytically.
MW(Di) is the molecular weight of the diisocyanate. This number is 250 for MDI diisocyanates.
MW(olig) is the molecular weight (number average) of the base isocyanate formulation containing the higher MDI series oligomers. It is equal to the number average functionality multiplied by the number average equivalent weight of the base isocyanate formulation.

The calculation of number average equivalent weights, molecular weights, and functionalities for simple blends of isocyanates is known in the art. Techniques for measuring these parameters analytically are also known. This information is known and available to a person of average skill in the art.

The above formula may be used even if the base isocyanate formulation containing the higher ($f \geq 3$) oligomers is not pure. For example, the polymethylene polyphenylene polyisocyanate may also contain some MDI diisocyanates (as is often the case in practice). This is easily accommodated by using the correct (number average) functionality, equivalent weight, and molecular weight for the isocyanate raw material in question in the formula above. The use of such mixed isocyanates is quite well known in the art. The functionality of the final base isocyanate composition must meet the specifications defined in the invention, regardless of how the base isocyanate composition is arrived at, or how the final (semi-prepolymer) isocyanate component is ultimately prepared.

The terms "equivalent weight" (EW), "molecular weight" (MW), and "functionality" (F) as applied to mixtures of individual compounds (fitting the specification of any one given type of ingredient defined in this invention), are understood to be number averages. These reduce to "absolute" (EW; MW; and F) for individual (pure) compounds, as determined from their molecular structure.

The terms "equivalent weight" and "functionality" pertain to the specific functional groups which are used in the invention (i.e., —NCO groups for isocyanates, —OH groups for polyols, primary+secondary amine groups for isocyanate-reactive amines, etc.). This formalism is well known in the art.

As used herein, the term "prepolymer" (i.e., of polyols in isocyanate) used in this invention is understood to mean a predominantly or exclusively urethane-group-containing reaction product of the polyol with excess isocyanate(s) (i.e.

more —NCO groups than —OH groups). The prepolymer may also contain a minor portion of allophanate groups (on a molar basis, relative to the urethane groups). The reactive functional groups remaining (after the prepolymer is formed) are —NCO groups. The term prepolymer is otherwise to be understood as generic. The term "semi-prepolymer" is understood to be a specific sub-type of prepolymer, in which the urethane species (formed from reaction of polyol with monomeric isocyanates species) are mixed with excess monomeric isocyanate species (which remain after the prepolymer-forming reaction). The term "monomeric isocyanate" species is understood to encompass any of the individual isocyanate molecules present in the base isocyanate (as defined above) or combinations thereof. This terminology is generally understood in the art.

In this invention, as noted above, the ratio of urethane groups to allophanate groups in the semi-prepolymer is preferably greater than 1:1 (i.e., more urethane linkages in the prepolymer than allophanate linkages); preferably greater than 2:1; more preferably greater than 3:1; still more preferably greater than 4:1; even more preferably greater than 5:1; and most preferably 10:1 or greater.

The term "nominal functionality" refers to the idealized (or expected) reactive group functionality of an individual ingredient—as predicted from the chemistry used in its manufacture (as opposed to measured functionality). In the manufacture of a polyether polyol, for example, the nominal functionality is equal to the functionality of the initiator used. Likewise, in the manufacture of an alkanolamine from the reaction of an amine initiator with an alkylene oxide, the nominal functionality is that of the initiator (i.e., the number of active hydrogens on the initiator). This distinction between nominal and actual (measured) functionality is known in the art. Nominal functionalities are widely used.

As used herein, the functionalities used for all compounds mentioned are to be understood as nominal. For pure compounds with precisely known structures, nominal and actual functionality are equal. For impure compounds, the actual and nominal functionalities may differ. Nominal functionality is an approximation (i.e., an assumption of purity). The actual functionality of an impure compound is here understood to be the number average of that of the compound plus that of all the impurities present. This is what one would measure (assuming a "perfect" measurement).

Use of nominal functionalities is simply a convenience. In the practice of this invention, it is preferred that the actual functionalities of the base isocyanate, chain extenders, and crosslinkers used (as described above) should not differ by more than about 10% (upwards or downwards) relative to the nominal values; preferably, by not more than about 7%; more preferably, by not more than about 5%; still more preferably, by not more than about 3%; even more preferably, by not more than about 1.5%; and ideally, by 0 to less than about 1%. It is likewise preferred that the actual functionalities of the relatively higher MW polyoxyalkylene polyether polyols used in this invention should not differ relative to the nominal values by more than about 30% (upwards or downwards); preferably, by not more than about 25%; more preferably, by not more than about 20%; still more preferably, by not more than about 15%; even more preferably, by not more than about 10%, and ideally, by 0 to less than about 5%.

As used herein, the expression "polyurethane foam" generally refers to cellular products as obtained by reacting polyisocyanates with isocyanate-reactive hydrogen containing compounds, using foaming agents and in particular, the term includes cellular products obtained with water as the reactive foaming agent (involving a reaction of water with isocyanate groups yielding urea linkages and carbon dioxide and producing polyurea-urethane foams).

The term "average nominal hydroxyl functionality" as used herein indicates the number average functionality (number of hydroxyl groups per molecule) of the polyol composition on the assumption that this is the number average functionality (number of active hydrogen atoms per molecule) of the initiators used in the preparation, although in practice it will often be somewhat less because of some terminal unsaturation.

The "isocyanate index" or "NCO index" or "index" refers to the ratio of NCO groups over isocyanate-reactive hydrogen atoms present in a formulation given as a percentage:

$$\frac{[NCO] \times 100\%}{[active\ hydrogen]}$$

In other words, the NCO-index expresses the amount of isocyanate actually used in a formulation with respect to the amount of isocyanate theoretically required for reacting with the amount of isocyanate-reactive hydrogens used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce the semi-prepolymer or other modified polyisocyanates or any active hydrogens reacted with isocyanate to produce modified polyols or polyamines are not taken into account in the calculation of the isocyanate index. Only the free reactive-hydrogens (including those of the water) and free-NCO groups present at the actual foaming stage are taken into account.

The expression "isocyanate-reactive hydrogens" as used herein for the purpose of calculating the isocyanate index refers to the total hydroxyl and amine hydrogen containing atoms present in the reactive compositions in the form of polyols, polyamines, and/or water; this means that for the purpose of calculating the isocyanate index in the actual foaming process one reactive hydroxyl group is considered to comprise one reactive hydrogen and one water molecule is considered to comprise two active hydrogens.

The term "polyisocyanate composition" is to be construed as including prepolymer and free polyisocyanate. Such free polyisocyanate may have been added to the prepolymer as well, provided the free NCO value of the polyisocyanate composition remains at the level as indicated hereinabove.

The term "reaction system" refers to a combination of ingredients wherein the polyisocyanate composition is kept in a container separate from the isocyanate-reactive ingredients.

As used herein it is to be understood, unless indicated to the contrary, that any term in the plural also includes the singular and vice versa.

As indicated hereinabove, the flexible polyurethane foams are prepared according to the process of the present invention by intimately contacting under effective reaction conditions an organic polyisocyanate composition with an isocyanate reactive composition in the presence of water as the sole blowing agent.

The polyisocyanate composition contains the semi-prepolymer which is formed from the reaction of an excess of the base isocyanate formulation with the first polyether polyol.

The base isocyanate formulation is a mixture of the various MDI diisocyanates, and the higher oligomers of the MDI series having the formula given hereinabove.

As indicated hereinabove, one of the critical parameters of the present invention is the reduction of the NCO functionality of the base isocyanate formulation due to the reduction in the amount of the polyphenylpolymethylene polyisocyanate content in the base isocyanate formulation. For purposes of this invention, and as will be explained hereinafter, it is important that the NCO functionality remain within the specified range. As defined herein, the functionality of the base isocyanate formulation ranges from 2.07 to 2.12, inclusive. It is more preferable that it ranges from 2.08 to 2.12, inclusive, and more preferably from 2.08 to 2.11 inclusive, and still more preferably from 2.09 to 2.11 inclusive and most preferably from 2.09 to 2.11, exclusive.

Concomitant with the reduction of the NCO functionality is an increase in the amount of 2,4'-MDI isomer in the diphenylmethane diisocyanate of the base isocyanate formulation within the specified limits. As indicated hereinabove, 2,4'-MDI is present in amounts ranging from about 21% to about 35% by weight of the diphenylmethane diisocyanate, and more preferably from about 23% to about 33% by weight and even more preferably from about 24% to about 32% by weight and most preferably from about 25% to about 31% by weight of the diphenylmethane diisocyanate.

As indicated hereinabove, this isomer is one of the various isomers of MDI present in the base isocyanate formulation. Other isomers include the 4,4'-MDI and the 2,2'-MDI. It is preferred that the 2,2'-MDI is either not present at all or is present in small amounts. As indicated hereinabove, the 2,2'-MDI is present in the MDI isocyanate stream in amounts ranging from and including 0 to about 2% by weight and more preferably from about 0.05% to about 1.8% and even more preferably from about 0.1 to about 1.7% and most preferably from about 0.1 to about 1.5%.

The remainder of the diphenylmethane diisocyanate of the base isocyanate formulation is the 4,4'-MDI such that the sum of the weights of the various isomers described hereinabove is 100%. Thus, the 4,4'-MDI is present in an amount ranging from about 63% to about 79% by weight of the MDI diisocyanate stream and preferably from about 64.2% to about 77.95% by weight, more preferably from about 65.3% to about 76.9% and most preferably from about 67.54% to about 74.9% by weight of the MDI diisocyanate stream.

The other main component of the base isocyanate includes the polymethylene polyphenylene polyisocyanates such as the higher oligomers of the MDI series wherein the functionality is 3 or higher. This has the structure given hereinabove. Although its concentration is reduced, it is important that it is not absent from the base isocyanate formulation. It is to be noted again that the functionality of the base isocyanate formulation reflects the relative concentration present in the base isocyanate formulation. As the concentration thereof increases in the base isocyanate formulation, the functionality thereof increases. On the other hand, if there is a reduction in the concentration of the oligomer, in the base isocyanate formulation, the functionality thereof decreases.

Both the MDI diisocyanate fraction and the higher oligomers of the MDI series are obtained by fractionation of "crude MDI". The processes for fractionation of MDI diisocyanates from higher functionality oligomers are well known in the art. The amounts of the individual higher ($f \geq 3$) oligomers (relative to each other) are not significantly changed by the techniques used currently on an industrial scale for isolating di-isocyanates from crude MDI. These relative proportions of the individual higher ($f \geq 3$) oligomers (hence the average functionality of the overall $f \geq 3$ oligomer mixture) may thereby be regarded as fixed.

Crude MDI is formed by condensation of aniline and formaldehyde in the presence of an acid catalyst (usually HCl), followed by phosgenation of the resulting polymeric amine mixture to give the corresponding mixture of isocyanates. This process produces a complex, but very predictable, distribution of higher ($f \geq 3$) oligomers.

The relative proportions of higher ($f \geq 3$) oligomers in the "higher oligomers of the MDI series (f=3 and higher)", as defined and employed in this invention, is typified by the known distribution of higher ($f \geq 3$) MDI series oligomers present in RUBINATE®-M (a commercial product available from ICI Polyurethanes). This product, and others like it, will be quite familiar to persons of average skill in the art. The distribution of higher ($f \geq 3$) MDI series oligomers in this, and related, products is also extensively known in the art.

The polyol for preparing the semi-prepolymer is a polyoxypropylene or polyoxypropylene-polyoxyethylene polyol. This product has a molecular weight ranging from about 1,000 to about 8,000. When the polyol is solely polyoxypropylene (i.e., it contains no ethylene oxide content), the molecular weight of the polyol ranges preferably from about 1,000 to about 4,000. A preferred polyoxypropylene is polypropylene glycol ("PPG") having a molecular weight ranging from about 1,000 to about 4,000.

When the polyol is polyoxypropylene-polyoxyethylene polyol, the product has a molecular weight ranging preferably from about 3,000 to about 7,000, and more preferably from about 4,500 to about 6,500, and even more preferably from about 5,000 to about 6,100, and most preferably from about 5,500 to about 6,000. The polyol(the polyoxypropylene or polyoxypropylene-polyoxyethylene) has a nominal functionality (of isocyanate reactive groups) of 2 to 4 and more preferably 2–3 and most preferably 3. Preferably, all of the isocyanate reactive groups in the polyol are hydroxy groups. Thus, the polyols are preferably diols and triols and most preferably triols. It is preferred that a majority of the hydroxy groups are primary hydroxy groups. If the polyol is a polyoxypropylene-polyoxyethylene glycol, it contains oxyethylene groups in an amount ranging from about 5% to about 30% by weight of the polyol, and more preferably from about 10% to about 20% by weight of the polyol and most preferably from about 12% to about 18% by weight of the polyol. At least about 50% and preferably at least about 75% by weight of the oxyethylene groups are present at the end of the polyether polyol chains (tipped).

It is within the scope of the present invention to use a mixture of polyols to make the semi-prepolymer, provided that the individual polyol ingredients used to make the mixture conform to the molecular specification noted above.

These polyols for use in preparing the semi-prepolymer are obtained from the polymerization of propylene oxide, if the polyol is polyoxypropylene, or if the polyol is polyoxypropylene-polyoxyethylene, the polyol is obtained from the polymerization of ethylene oxide with propylene oxide. In either reaction system, the reaction is performed in the presence of initiators having a nominal functionality of 2 or 3. Suitable initiator compounds include water, low molecular weight polyols (for example, ethylene glycol, propylene glycol, diethylene glycol, dipropylene glycol and the like), cyclohexanedimethanol, glycerol, trimethylolpropane, 1,2,6-hexanetriol, and the like.

The semi-prepolymer is prepared by reaction of an excess amount of the base isocyanate formulation with an amount of the polyether polyol effective to produce the semi-prepolymer, utilizing techniques known in the art. For example, the semi-prepolymer may be prepared by prereacting all of the polyol with the diphenylmethane diisocyanate, separately from the higher oligomers, followed by dilution of the resulting intermediate semi-prepolymer with additional MDI containing the higher oligomers. Such reaction is allowed to take place at effective reaction conditions to form the semi-prepolymer. For example, the reaction is preferably conducted at temperatures ranging from about 40° C. to about 100° C. If desired, the reaction may be conducted in the presence of catalysts which enhance the formation of urethane groups, like tertiary amines and tin compounds, which are known to the skilled artisan. Since the product is a semi-prepolymer, some of the monomeric isocyanate species remain unreacted. Thus, the amount of polyol used to make the semi-prepolymer ranges from about 5% to less than about 50% by weight of the final isocyanate composition; preferably from about 7% to about 30%, more preferably from about 8% to about 25%, still more preferably from about 8.5% to about 20% and most preferably from about 9% to about 15% by weight of the isocyanate composition. It is preferable that the NCO index of the semi prepolymer is at most 30%; it is more preferred that the NCO index of the semi-prepolymer ranges from about 12% to about 30%.

The polyisocyanate composition is most preferably substantially devoid of non-MDI type isocyanates, especially toluene diisocyanates. By "non-MDI type isocyanates," it is meant organic polyisocyanates, such as aliphatic, cycloaliphatic, araliphatic or aromatic polyisocyanates, other than MDIs, which are known to those skilled in the art. Nevertheless, a small amount of these non-MDI type isocyanates may be present, i.e., the present invention may contain up to about 15 weight percent relative to the base isocyanate composition of non-MDI isocyanates, preferably less than about 10%, more preferably less than about 5%; still more preferably less than about 2% and most preferably 0 to less than about 1% by weight of the base isocyanate composition. If present, these non-MDI type isocyanates are preferably liquid at room temperatures. Examples include, but are not limited to, 1,6-hexamethylene diisocyanate, isophorone diisocyanate, 1,4-cyclohexane diisocyanate, 4,4'-dicyclohexylmethane diisocyanate, 1,4-xylylene diisocyanate, 1,4-phenylene diisocyanate, 2,4-toluene diisocyanate, 2,6-toluene diisocyanate, 1,5-napthylene diisocyanate, and the like.

The final polyisocyanate composition is preferably substantially devoid of polyols other than the polyols mentioned hereinabove. Nevertheless, other polymeric polyols may be present in minor amounts. For example, polyesters obtained by the condensation of glycols and higher functionality polyols with dicarboxylic acid may additionally be present. In addition, other polymeric polyols which may be present include hydroxyl terminated polythioethers, polyamides, polyesteramides, polycarbonates, polyacetals, polyolefins and polysiloxanes known to the skilled artisan in this art. If present, these additional polyols are in amounts less than about 9% by weight relative to the base isocyanate composition, and preferably less than about 7%, more preferably less than about 5%, still more preferably less than about 2% and most preferably 0 to less than about 1% by weight relative to the base isocyanate composition.

The final polyisocyanate composition may additionally contain MDI variants, e.g., MDI polyisocyanates that have been modified by the introduction of urethane, allophanate, urea, biuret, carbodiimide, uretonomimine, isocyanurate, and/or oxazolidone residues. These MDI variants are present in amounts less than about 8% by weight relative to the base isocyanate composition. Such derivatives are preferably present in less than about 5% by weight, more preferably less than about 2% by weight.

The final polyisocyanate composition may also contain minor amounts of inert additives such as fillers; antioxidants; UV stabilizers; diluents (such as solvents); surfactants; fire retardants; mold release agents; dyes; pigments; and the like. Preferably these additives are present in amounts of less than 10% by weight of the polyisocyanate composition; more preferably less than 5%; still more preferably less than 2%; even more preferably 1% or less; and most preferably 0 to less than 0.5% by wt. of the polyisocyanate composition. It is to be noted that the calculation of the base isocyanate composition functionality neglects the inert (f=0) ingredients.

The final polyisocyanate composition contains less than about 10 percent by weight of monofunctional isocyanate species; preferably less than about 5%; more preferably less than about 2%; still more preferably less than about 0.5%; and more preferably 0 to less than about 0.2% of such monofunctional species by weight relative to the final polyisocyanate composition.

The isocyanate reactive composition comprises several components.

One of the components is a second polyoxypropylene-polyoxyethylene polyol (hereinafter referred to as "Polyol A"). This polyol may be the same as or different from the first polyol used in the polyisocyanate composition described hereinabove. The second polyol may be one component or a mixture of more than one polyol, as long as the polyols utilized fit the description described hereinabove. In an embodiment of the present invention, the second polyol is a mixture of two polyols wherein the first component of the second polyol is a triol, while the other component is a diol. In this embodiment, the weight ratio of triol to diol is between about 55:45 to about 95:5; preferably between about 60:40 to about 90:10, more preferably between about 65:35 to about 85:15 and still more preferably between about 70:30 to 80:20. Examples of a suitable triol is Rubinol®F428, which is an oxypropylated glycerol (triol), with an oxyethylene content of 14.7% (cap.) and a hydroxyl number of 28, and the like, while an example of a suitable diol is Rubinol®F459, which is an oxypropylated dipropylene glycol (diol), with an oxyethylene content of 20.7% (cap.) and a hydroxy number of 30.

The second polyol is present in amounts ranging from about 60 to about 97% of the polyisocyanate reactive composition and more preferably from about 70 to about 95 by weight of the polyisocyanate composition and most preferably from about 75 to about 94% by weight of the polyisocyanate composition.

Another component of the polyisocyanate reactive composition is the blowing agent. As indicated hereinabove, water is the sole blowing agent. The amount of water used is important in obtaining excellent quality foams; too high a level will result in excessive compression set values, while too low a value will lead to unacceptably high density in the foam. The water is present in amounts effective to produce a polyurethane foam with the density and compression set values given hereinbelow. It is preferably present in amounts ranging from about 2.5 to about 7% by weight relative to the weight of the second polyol, and more preferably from about 3.0% to about 6.5% by weight, and still more preferably, from about 3.5% to about 5.5% by weight and even more preferably from about 3.7% to 5.0% by weight and most preferably from about 3.8% to about 4.8% by weight relative to the weight of the second polyol (Polyol A).

Another component of the isocyanate reactive composition is a catalyst which is used to catalyze (accelerate) the reaction of the polyisocyanate composition with the isocyanate reactive composition. Useful catalysts include tertiary amine catalysts, and organometallic catalysts known in the art. Preferred catalysts are aliphatic tertiary amines or salts thereof, including carboxylic acid salts thereof, especially those containing 1–11 carbon atoms. Preferred aliphatic tertiary amines are either free of isocyanate reactive groups or contain one isocyanate reactive group. Highly preferred aliphatic tertiary amine catalysts are triethylenediamine (TEDA), N,N-dimethyl ethanolamine (DEMA), bis-N,N-dimethylamino diethyl ether [$(CH_3)_2N\ CH_2CH_2O—CH_2CH_2N(CH_3)_2$]. Other tertiary amine catalysts include N-cocomorpholine, 1-methyl-4-dimethylaminoethylpiperazine, methoxypropyldimethylamine, N,N,N'-trimethylisopropyl-propylenediamine, 3,3-diethylamino propyl diethylamine, dimethylbenzylamine, 1,4-diazobicyclo [2,2,2,] octane and the like. As used herein, the tertiary amine catalysts may optionally include the salts thereof. Organometallic catalysts include dibutyltin dilaurate, dibutyltin diacetate, stannous dichloride, dibutyltin di-2-ethylhexanoate, stannous oxide and the like. The catalysts are present in catalytic effective amounts. Preferably, they are present in amounts ranging from about 0.05% to about 5% by weight relative to the weight of the second polyol. More preferably, the total weight of the catalytically active species present ranges from about 0.1% to about 3%, even more preferably from about 0.15% to about 2.5%, still more preferably from about 0.25% to about 2% and most preferably from about 0.3% to about 1.5% relative to the weight of the second polyol. The catalysts which may be used include those which are commercially available, such as Niax® A-1 (bis-2-dimethylaminoethyl ether), Dabco®33 LV, (triethylene diamine), Dabco®8800 (an amine type catalyst in dipropylene glycol used as a delayed action catalyst), Dabco®DMEA (dimethyl-ethanolamine), and the like.

Another component of the reaction system in the present process is a crosslinker. It has a nominal functionality of 3–4 and preferably 3 and has a molecular weight ranging from about 92 to about 300, and preferably from about 100 to about 200. Suitable crosslinkers include low molecular weight diols. The preferred crosslinker contains an aliphatic secondary amine group and two hydroxyl groups. The most preferred crosslinker is diethanolamine. The crosslinker is present in the isocyanate reactive composition in amounts ranging from greater than about 0 to about 3% by weight relative to the second polyol, and more preferably from about 0.5% to about 1.5% and most preferably from about 0.7% to about 1.4% by weight relative to the second polyol. Mixtures of crosslinkers may be used, provided that the combined loading and the molecular specifications of the individual crosslinkers conform to the limits defined herein.

The isocyanate reactive composition may further comprise a surfactant. Surfactants are generally necessary to improve miscibility of chemicals and insure greater foam stability as well as control cell structure. The surfactants that are useful in the present invention are those that are generally known in the flexible foam art. The preferred surfactants are the nonionic surfactants, especially the polysiloxanes. These include the hydrolyzable polysiloxane-polyoxyalkylene block copolymers or "non-hydrolyzable" polysiloxanepolyoxyalkylene block copolymers described in U.S. Pat. Nos. 2,834,748, 2,917,480, 3,505,377, 3,741,417, 3,887,483, 3,980,688, 4,025,452, and 4,071,493, the contents of all of which are incorporated by reference. Yet another useful class of silicone surfactants are cyanoalkylpolysiloxanes as described in U.S. Pat. Nos. 3,905,924, 3,952,038 and 4,003,847, the contents of all of which are incorporated by reference. As is known in the art, the selection of a particular silicone surfactant for use in a particular foam formulation will depend on such properties as the reactivity of the polyol in the formulation and the like. A preferred surfactant is Niax®L3001, which is a blend of organic silicones, and the like.

It is preferred that it is present in amounts ranging from between about 0.05% and about 3% by weight relative to the weight of the second polyol, and more preferably from about 0.1% to about 2% by weight, and even more preferably from about 0.2% to about 1% and most preferably from about 0.2% to about 0.5% by weight relative to the weight of polyol A.

Other components of the isocyanate reactive composition are optional, but are usually present.

In addition, low molecular weight chain extenders are optionally added to the isocyanate reactive composition.

Suitable chain extenders will be evident to those skilled in the art from the present disclosure. In general, useful chain extenders are those having a formula weight of about 60 to about 330 and more preferably from about 100 to about 300. They have at least two active hydrogen functional groups. The preferred chain extenders are aliphatic diols and/or aromatic amines, and they include such examples as primary and secondary diamines, amino alcohols, lower glycols and mixtures thereof. Preferred chain extenders are selected from lower glycols such as ethylene glycol, diethylene glycol, butanediol, dipropylene glycol, and tripropylene glycol; aliphatic and aromatic amines, e.g. 4,4'-methylene dianilines having a lower alkyl ($C_1$–$C_6$) substituent positioned on each N-atom, and the like. Other chain extenders include primary and secondary diamines which react more readily with the polyisocyanates utilized in the present invention than does water. These include phenylenediamine, ethylenediamine, piperazine, 2-methylpiperazine, and the like. The above-mentioned chain extending agents can be used singularly or combined or in admixture with other compounds including diethylene glycol, dipropylene glycol, ethanolamine, N-methyldiethanolamine, and N-ethyldiethanolamine and the like.

When utilized, the chain extenders are present in an amount of less than about 4% by weight relative to the weight of the second polyol, and more preferably less than about 3% and still more preferably less than about 2.5% and most preferably about 2% or less by weight relative to the weight of the second polyol.

Another optional ingredient is a third polyol selected from the group consisting of polyoxyethylene glycol, a diol of polyoxyethylene-polyoxypropylene, a triol of polyoxyethylene-polyoxypropylene and combinations thereof. Unlike the first and second polyols described hereinabove, the third polyol has an ethylene oxide content of at least about 50% by weight and more preferably from about 50% to about 90% by weight and more preferably from about 65% to about 85% by weight and most preferably from about 70% to about 80% by weight. These polyether polyols include random copolymers and block copolymers having the ethylene oxide content indicated hereinabove. This polyol has a molecular weight of greater than about 500 and less than about 10,000 and preferably in the range from about 600 to about 6,000 and more preferably from about 600 to about 4500. If present, it is present in amounts up to about 10% by weight relative to the weight of the second polyol. Preferably, it is present in amounts ranging from about 0.5% to about 7% by weight and more preferably from about 1% to about 6% by weight, still more preferably from about 1.5% to about 6% and most preferably from about 2% to about 6% by weight relative to the weight of the second polyol.

These polyols are prepared by the sequential polyaddition of propylene and ethylene oxides to di-or tri-functional initiators such as ethylene glycol, propylene glycol, diethylene glycol, and the like; cyclohexane dimethanol, trimethylolpropane, 1,2,6-hexanetriol, mixtures thereof and the like in accordance with the procedure described in the prior art.

Another optional component of the isocyanate reactive composition comprises dispersed or grafted organic polymer solids, by inclusion of polymer modified polyols into polyol A. These modified polyols are dispersions of addition or condensation polymers in polyol A. Such modified polyols, often referred to as "polymer polyols" have been fully described in the prior art and include products obtained by the in situ polymerization of one or more vinyl monomer, for example, stryene and/or acrylonitrile, in polyether polyols referred to as 'base polyols.' The base polyols conform to the structural parameters as defined above for Polyol A. The dispersed solid phase in the polymer polyols may also be obtained by the in situ reaction between a polyisocyanate and an amino and/or hydroxy-functional compound such as triethanolamine in the polymeric polyol. If present, it is preferred that this component is present in amounts of less than about 10% by weight of polyol A. If present, it is preferred that it contains up to at most about 5% solids, and more preferably about 0.1% to about 3% solids, still more preferably about 0.4% to about 2.5% solids and most preferably about 1.2% to about 1.9% organic polymer solids.

The isocyanate reactive component may optionally contain still other conventional additive ingredients, different from those noted above, which are known in the flexible urethane foam art. These are listed hereinbelow with the weight percentages listed relative to that of the second polyol.

i) Fillers or reinforcements; such as inorganic fillers, or additional organic fillers, in amounts from about 1% to about 200%; preferably less than about 100%; more preferably less than about 50%; still more preferably less than about 30%; even more preferably about 20% or less; and most preferably about 10% or less relative to the weight of the second polyol. Examples of fillers include calcium carbonate, silica, mica, wollastonite, wood flour, melamine, glass, mineral fibers, glass spheres, mixtures thereof and the like.

ii) Fire retardants; such as organophosphorus compounds, halogenated organic compounds; melamine; alumina trihydrate, trichloride phosphate, and the like. These may be present in amounts up to about 100%; preferably less than about 50%; more preferably less than about 30%; still more preferably about 20% or less; even more preferably less than about 15%; and most preferably less than about 10% relative to the weight of polyol A.

iii) Dyes or pigments. They are present in amounts less than about 10%; preferably less than about 5%; more preferably less than about 3%; still more preferably less than about 2%; even more preferably about 1% or less; and most preferably about 0.5% or less relative to the weight of polyol A. Examples include carbon black, calcium carbonate, titanium dioxide, and the like.

iv) Diluents or solvents; such as propylene carbonate; N-methyl pyrrolidinone; linseed oil and the like. These species are preferably present (if used at all) in amounts of less than about 10%; more preferably less than about 5%; more preferably less than about 3%; still more preferably less than about 2%; even more preferably about 1% or less; and most preferably about 0.5% or less relative to the weight of polyol A.

v) Specialized functional additives, selected from the group consisting of: antioxidants (such as 3,5-di-t-butyl-4-hydroxy toluene and higher molecular weight hindered phenols, and the like); UV stabilizers; biocides; adhesion promoters; antistatic agents (such as "Lubrol" available from ICI Americas, Inc. and the like); smoke suppressants (other than the fire retardants already noted); mold release agents (such as Zinc Stearate and the like); and fragrances. These additives are individually present (when used at all) in amounts of less than about 8%; preferably less than about 4%; more preferably less than about 2%; even more preferably about 1% or less; and most preferably about 0.5% or less by weight relative to the weight of polyol A. They are collectively present in amounts of less than about 20%; preferably less than about 15%; more preferably less than about 10%; still more preferably less than about 8%; even more preferably less than about 5%; and most preferably less than about 2% by weight relative to the weight of polyol A.

vi) Polyols other than those specified above; such as polyols which do not satisfy the molecular specifications identified for the polyols noted above. These include the polyester polyols, hydroxy-terminated polythioethers, polyamides, polyesteramides, polycarbonate, polyacetals, polyolefins, and the polysiloxanes referred to hereinabove in the discussions of the polyisocyanate composition.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxy-ethyl) terephthalate, glycerol, trimethylolpropane, pentaerythritol or polyether polyols or mixtures of such polyhydric alcohols with polycarboxylic acids, especially dicarboxylic acids or their ester-forming derivatives, for example succinic, glutaric and adipic acids of their dimethyl esters, sebacic acid, phthalic anhydride, tetrachlorophthalic anhydride, dimethyl terephthalate or mixtures thereof. Polyesters obtained by the polymerization of lactones, for example carprolactone, in conjunction with a polyol, or of hydroxy carboxylic acids such as hydroxy caproic acid, may also be used.

Polyesteramides may be obtained by the inclusion of amino alcohols such as ethanolamine in polyesterification mixtures.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example, diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo-and copolymers and suitable polysiloxane polyols include polydimethylsiloxane diols and triols.

It is within the scope of the present invention to incorporate minor amounts of such additional polyol species, such that the total is less than about 10% by weight relative to the weight of the second polyether polyol above; preferably less than about 7%; more preferably less than about 5%; still more preferably less than about 3%; even more preferably less than about 2%; and most preferably less than about 1% relative to the weight of polyol A.

The polyurethane foams of the present invention are prepared by conventional methods which will be evident to one skilled in the art from the present disclosure. The isocyanate reactive composition containing the polyol composition, water, catalyst, surfactant, and other optional ingredients is prepared by blending the various ingredients mechanically using mechanical devices known in the art. The isocyanate reactive composition is then mixed together with the polyisocyanate composition to form the flexible polyurethane foam of the present invention. It is preferred that all or most of the additives are incorporated into the isocyanate reactive composition. In this embodiment, it is preferred that the isocyanate composition contains no additives at all or at most only the isocyanate-soluble additives indicated hereinabove, such as diluents, antioxidants, UV stabilizers, biocides, and/or catalysts which do not cause the isocyanate to "self react" under normal conditions of processing or storage prior to use.

However, it is within the scope of the present invention to use more than the two components, i.e., the polyisocyanate composition and the isocyanate reactive composition. The additional components, if used, are preferably formed by sub-dividing the two main system components, and more preferably it is only the isocyanate reactive composition that is sub-divided.

The most preferred use of multi-(i.e. >2)-component processing is to control the introduction of additives (especially catalysts; surfactants; fire-retardants; fillers; and/or unusual specialty additives). In this situation, it is permissible to sub-divide (i.e., keep separate) all or part of the relevant additives from the isocyanate reactive component into separate component stream(s), optionally using some portion of the polyols therefrom to provide a carrier for said additives. The use of multi (>2) component processing is well known in the art.

The polyisocyanate composition is mixed with the isocyanate reactive composition in a weight ratio ranging from about 1:4 to about 4:1, respectively and more preferably from about 1:3.5 to about 3.5:1, and more preferably from about 1:3 to about 3:1, and still more preferably from about 1:2.5 to about 2.5:1 and even more preferably from about 1:2 to about 2:1, most preferably from 1:1.8 to 1.8:1 and ideally 1.79:1 to 1:1.79. The water-blown polyurethane system is run at an index from about 75% to about 102%, preferably about 80% to about 95%, more preferably about 80% to about 90%, still more preferably from about 82% to about 90% and most preferably from about 85% to about 90%.

The present reaction systems are formulated in such a manner so as to obtain flexible foams which are highly stable and have good tensile properties, low compression sets and relatively low density. In its preferred embodiment and to achieve these objectives, the polymethylene-polyphenylene polyisocyanate content, the percentage of 2,4' MDI in the organic polydiisocyanate composition, the ethylene oxide content of the polyol composition and the amount of water in the reaction system may be varied relative to each other in order to provide the desired foam. Although, not wishing to be bound to a specific theory, it is believed that these variables are interdependent. For example, as the level of ethylene oxide in the polyol composition is reduced and/or the water content is increased, the levels of polymethylene-polyphenylene polyisocyanate and/or the 2,4'-MDI content in the organic diisocyanate must be increased to obtain a stable, low density foam. For any given level of ethylene oxide in the polyol composition and water in the B side of the system, there is believed to be an interdependent level of 2,4'-MDI and polymethylene-polyphenylene polyisocyanate in the A side, all amounts being within the ranges presently disclosed and claimed. Suitable variations of these components necessary to obtain desired foams will be evident to one skilled in the art from the present disclosure.

The flexible polyurethane foam of the present invention is typically prepared by intimately mixing the components at room temperature or at slightly elevated temperatures for a short period and then pouring the resulting mixture into an open mold, or injecting the resulting mixture into a closed mold, which in either case is heated. Upon completion of the reaction, the mixture takes the shape of the mold to produce a polyurethane foam of a predefined structure, which can then be sufficiently cured and removed from the mold with a minimum risk of incurring deformation greater than that permitted for its intended end use application. Suitable conditions for promoting the curing of the foam include a mold temperature of typically from about 20° C. to about 75° C., preferably from about 35° C. to about 75° C., and more preferably from about 55° C. to about 65° C. Such temperatures generally permit the sufficiently cured elastomer to be removed from the mold typically in about 1 to 10 minutes and more typically in about 1 to 5 minutes after intimately mixing the reactants. Optimum cure conditions will depend on the particular components including catalysts and quantities used in preparing the foam and also the size and shape of the article manufactured.

Alternatively, the foams may be prepared in standard high pressure machines, including multi-component machines, at the mold temperature and component pressures and throughput indicated hereinbelow. Examples of high pressure molding machines include Krauss Maffer RIM-Star 40 or the Cannon H-40. In addition, the foams may be prepared in low pressure machines or by hand mixing.

The flexible polyurethane foams produced from the reaction system of the present invention have excellent physical properties. The flexible polyurethane foams produced with the present reaction system have a reduced density, a low compression set, and a high tear strength relative to conventional MDI-based foams.

The flexible polyurethane foams produced in accordance with the present invention have a molded core density of about 25 to about 45 kg/m$^3$ and preferably from about 30 to about 40 kg/m$^3$ and more preferably about 32 to about 38 kg/m$^3$.

An especially surprising benefit of this invention is the ability to mold complex all-MDI based foam articles at low densities, with reduced mold residence times and gel times. Although mold filling ability is significantly improved by using the specified low-functionality MDI isocyanates, the minimum mold residence time is also simultaneously reduced.

In fact, the polyurethane foams of the present invention can be demolded in as little as 1.5 minutes, and yet still provide sufficient gel time to achieve good flow. Gel times are measured by means of a cup shot from the foam machine (i.e., the machine used to process the system). The gel time is sometimes referred to as the "string time", i.e., the time which elapses before the mixture becomes stringy. Heretofore, fast demolding MDI systems gel almost instantaneously, thus impeding their ability to flow in the mold. Such a product is unsatisfactory, especially for making molds of large objects, such as automobile seats. Other products made from MDI system, especially in the seating industry, have demold times in the 3 to 6 minute range and have a long gel time. However, the products of the present invention have a relatively short gel time and are capable of exhibiting a fast demold time. More specifically the gel time of the polyurethane foams of the present invention is more preferably from about 15 to about 45 seconds, preferably about 20 to 35 seconds and more preferably from about 20 to about 30 seconds. In addition, the foams produced in the present invention have short minimum mold residence time. They are not more than about 3 minutes and preferably not more than about 2.5 minutes, more preferably not more than about 2.25 minutes, still more preferably not more than about 2 minutes; even more preferably not more than about 1.75 minutes, and most preferably not more than about 1.5 minutes.

A key factor which generally limits the minimum mold-residence time is the tendency of the cured foam to shrink after demolding. Foams which tend to do this are said, in the language of the art, to be "tight". Tight foams also tend to bulge outwards when the mold is first opened. Tightness is theorized to be due to the presence of unopened cells in the foam. But, the molded foams prepared according to the invention are less "tight" at shorter demold times. This has made it practical to reduce mold residence times to between about 1.5 and about 3.0 minutes, and more preferably from about 1.5 minutes to about 2.0 minutes for low density flexible foams, without special (hence costly) measures to alleviate "tightness".

Special measures to alleviate "tightness" are known. For example, it is generally known in the art that longer mold residence times tend to produce foams which are less "tight" (all other things being equal). Other measures include special mold-opening procedures involving timed pressure release and "crushing" of the molded foam articles (by squeezing them between a pair of rollers or by vacuum). These are not universally effective, and it is best not to use any of them, if possible. However, the resulting extended mold residence time of the tight foams reduces productivity.

Crushing techniques have varying degrees of severity. Simple crushing involves only one pass through the rollers. More complicated (hence more costly) crushing techniques involve multiple passes through the rollers, and/or crushing under reduced pressures (vacuum crushing). It is most desirable not to use crushing at all. Where crushing is needed, it is highly desirable to use only simple crushing (i.e. a single pass through the rollers, without applying a vacuum).

It has been unexpectedly and surprisingly found that the foams according to this invention are less "tight" at relatively short mold residence times (about 1.5 to about 3.0 min.), and therefore require either no crushing or only "simple" crushing (as described above). This is a major productivity advantage.

The foams start getting "tighter" at base-isocyanate functionality of 2.12 and above. For example, foams made at base-isocyanate functionality of 2.14 were very tight.

Foam stability decreases as base isocyanate functionality drops below 2.07. It is therefore more difficult to achieve the desired (low) molded densities at base isocyanate functionalities below 2.07 (i.e. the "minimum fill weights" become too high). Likewise, decreased 2,4'-MDI isomer concentrations (i.e. below the levels specified in the invention) result in poorer foam stability—hence higher densities.

Thus, there is a critical range of base isocyanate functionality as indicated hereinabove. As long as the base isocyanate functionality lies within the specified limits indicated herein, the polyurethane foams prepared from the reaction system of the present invention have the characteristics described herein. Outside the range, the polyurethane foams formed have poorer physical properties.

Besides reducing the functionality of the base isocyanate formulation, the amount of 2,4'-MDI is concomitantly increased. Without wishing to be bound, it is believed that this avoids destabilization of the foam and avoids an increase its density.

The upper limits on the 2,4'-MDI content of the isocyanate are determined by foam cure requirements, and monomer availability. At levels much above the upper limits specified in the invention, the foams may require more time to cure and surface defects may occur on demolding.

Other physical characteristics possessed by the polyurethane foam of the present invention are indicated hereinbelow: Physical properties of the foams were determined in accordance with ASTM D3574, a protocol which is known in the industry.

(1) Compression Set (at 50% compression; in units of % deflection): Less than about 28%; preferably about 25% or lower; more preferably about 22% or less; still more preferably about 20% or less; most preferably under about 20%.

(2) Elongation (% to break): At least about 100%; preferably about 110% or greater; more preferably about 120% or higher; still more preferably about 135% or above; even more preferably about 140% or higher; most preferably about 150% or above.

(3) Tear Resistance (N/m): At least about 200; preferably at least about 210; more preferably at least about 220; still more preferably about 230 or higher; even more preferably about 240 or above; and most preferably about 250 or higher.

(4) Mold Temperature (Degrees C.): From about 30 to about 75; preferably about 35 to about 70; more preferably about 40 to about 70; still more preferably about 50–70; even more preferably about 55–68; and most preferably about 60–65.

(5) Mix Pressures (in Bar; for either component; component mix pressures are preferably the same); From about 80 to about 180; preferably about 100 to about 160; more preferably about 120 to about 150.

(6) Pour Rate (for the reacting mixture of components; in g/sec.); From about 175 to about 325; preferably about 200 to about 300; more preferably about 225 to about 275.

(7) Component Temperatures (Degrees C.; for either component; component temperatures are preferably all the same): From about 25 to about 50; preferably about 30 to about 45; more preferably about 32 to about 40; still more preferably about 35 to about 40; most preferably greater than about 35 but less than about 40.

(8) Foam Hardness (50% ILD;N): From about 130 to about 400; preferably about 170 to about 300; and more preferably about 200 to about 250 for a block of about 38 cm×38 cm×10cm.

The polyurethanes so produced are utilized in low density flexible foam applications where any conventional types of flexible polyurethane is or can be utilized. The flexible polyurethane foams of the present invention find particular utility in the production of high resiliency foams for use in arm rests, mattresses, automobile seats, and the like as well as in slabstock foams for use as carpet underlayment, and the like.

Without wishing to be bound, it is believed that the above characteristics are attributable to the use of the semi-prepolymer. Most surprisingly, when using the low functionality base isocyanates of the invention, as indicated by the above ranges, the semi-prepolymer produces foams with better compression-set resistance than analogous foams made with all the polyol(s) in the B-side. Additionally, it improves the resistance of the final polyisocyanate composition to crystallizing or turning cloudy on storage at ambient temperature (i.e. it provides better storage stability). It also helps in adjusting the A side to B side processing ratio. The maximum amount of polyol which may be incorporated into the semi-prepolymer is strictly limited by processing constraints—such as the weight ratios described hereinabove with respect to the polyisocyanate composition and isocyanate reactive composition ratio limits imposed by foam machines, and final viscosity of the polyisocyanate composition (which rises as the semi-prepolymer loading increases).

In addition to having better processability, the polyurethane foams produced in accordance with the present invention have better properties than prior art water-blown MDI flexible foam systems. Furthermore, the formulations of the present invention produce low density foams with inherently better fire-retardant properties. It has been discovered, unexpectedly and surprisingly, that in spite of the low density, the foams prepared in accordance with the present invention achieve a "self-extinguishing" (S.E.) rating, according to Federal Motor Vehicle Safety Standards (FMVSS) flammability testing—without the use of fire retardant additives (or of fire retardant monomers).

Unless stated to the contrary, all percentages are weight percentages. Moreover, unless indicated to the contrary, all weights are in grams.

The following examples further illustrate the invention.

In the examples, the following formulations and reaction components are used:

| | |
|---|---|
| Rubinol ® F428 | an oxypropylated glycerol (triol) having EO content of 14.7%, and OH # = 28 |
| Rubinol ® F459 | Oxypropylated dipropylene glycol (diol) having EO content of 20.7% OH # = 30 |
| Rubinol ® F417 | Polyether polymer polyol based on reaction of triethanolamine and uretonimine-modified MDI having the following composition: 80.6 wt. % Rubinol ® 428, 15.4 wt. % Adduct of triethanolamine and Rubinate ® 1680 (uretonimine-modified) 3.0 wt. % free triethanolamine OH # = 54 |
| Rubinol ® F435 | An oxypropylated glycerol (triol) having EO content of 17% OH # = 35 |
| Carbowax ® PEG 600 | 600 molecular weight polyethylene glycol |
| Niax ® DEOA-LF | 85% diethanolamine + 15% water (used as cross-linker) available from Union Carbide |
| Niax ® A-1 | a tertiary catalyst available from Union Carbide, and consisting of about 70% by weight Bis-2-dimethylaminoethyl ether and 30% by weight glycols |
| Dabco ® 33LV | a 33% by weight solution of triethylene diamine in dipropylene glycol used as a catalyst available from Air Products Corporation |
| Dabco ® 8800 | Amine-type catalyst in dipropylene glycol (used as a delayed action catalyst), available from Air Products Corp. |
| Dabco ® DMEA | Dimethylethanolamine available from Air Products Corporation |
| Unilink ® 4200 | n,n'-di-sec-butyl-4,4'diamino diphenylmethane OH # = 353.0 (used as a chain extender) |
| Niax ® L 3001 | Blend of organic silicones (used as a surfactant), available from Union Carbide |
| MI 30 | This is a mixture of 2,2' MDI, 2,4' MDI and 4,4' MDI in the following proportions: MDI 2,2' <2% |

-continued

| | | |
|---|---|---|
| | MDI 2,4' | 28–32% |
| | MDI 4,4' | remaining % |
| PBA 2273 | This is a mixture of 2,4' MDI, 4,4' MDI and the polymethylenepolyphenylene polyisocyanate as defined herein (hereinafter referred to as "PPP") having a functionality greater than or equal to 3 | |
| | MDI 2,4' | 2–3% |
| | MDI 4,4' | ~45% |
| | PPP | remaining % |

In the tables, the following abbreviations are utilized

Iso index: NCO index of the polyurethane system

Cream Time: is the time from the addition of the isocyanate during mixing of the components until the visible movement or expansion of the foam mixture begins.

C.S.: Compression Set

HACS: Humid Age Compression Set

EXAMPLES 1–6

In these examples, the polyurethane foam was prepared from a reaction system in which the polyisocyanate composition was mixed with the isocyanate reactive composition in the presence of water in accordance with the teachings described herein. More specifically, MI30 was reacted with Rubinol®F428 at about 80°C. for about an hour to form the prepolymer. While the prepolymer was cooling, PBA 2273 was added at about 60° C. Then the mixture was allowed to cool down to room temperature.

The polyols utilized were those listed hereinbelow. The polyols were first charged into a mix tank. While the polyols were mixing, the catalysts and other additives listed hereinbelow were added. While this blend was mixing, surfactant and then water were added. The entire blend was then mixed for about 20 minutes on a Cowles mixer at about 600 rpm to make the blend.

The polyisocyanate and isocyanate reactive compositions were placed into two separate containers of a Krauss-Maffei RIM-Star-40 high pressure machine. The foam was prepared by conducting the appropriate amount of each component as indicated by the A/B ratio or the NCO index via suitable pumps to the mixing head of the high pressure machine, in accordance with techniques known in the art.

The amounts of each component utilized are tabulated hereinbelow by weight:

|  |  | wt. % | | | | | |
|---|---|---|---|---|---|---|---|
| Component | | Ex. 1 | Ex. 2 | Ex. 3 | Ex. 4 | Ex. 5 | Ex. 6 |
| 1. Polyisocyanate (Fn = 2.102) | | | | | | | |
| a. Prepolymer | | | | | | | |
| MI 30 | | 73 | 73 | 73 | 73 | 73 | 73 |
| Rubinol ® F 428 | | 9 | 9 | 9 | 9 | 9 | 9 |
| b. Polymeric Isocyanate | | | | | | | |
| PBA 2273 | | 18 | 18 | 18 | 18 | 18 | 18 |
| 2. Isocyanate Reactive Composition | | | | | | | |
| Rubinol ® F 428 | | 79.85 | 79.85 | 79.85 | 79.85 | 79.85 | 79.55 |
| Rubinol ® F 417 | | 7.99 | 7.99 | 7.99 | 7.99 | 7.99 | 7.96 |
| Carbowax ® PEG 600 | | 5.59 | 5.59 | 5.59 | 5.59 | 5.59 | 5.57 |
| Niax ® DEOA-LF | | 1.198 | 1.198 | 1.198 | 1.198 | 1.198 | 1.432 |
| Niax ® A-1 | | 0.168 | 0.168 | 0.168 | 0.168 | 0.168 | 0.167 |
| Dabco ® 33LV | | 0.096 | 0.096 | 0.096 | 0.096 | 0.096 | 0.676 |
| Dabco ® 8800 | | 0.639 | 0.639 | 0.639 | 0.639 | 0.639 | — |
| Dabco ® DMEA | | 0.319 | 0.319 | 0.319 | 0.319 | 0.319 | 0.318 |
| Niax ® L 3001 | | 0.399 | 0.399 | 0.399 | 0.399 | 0.399 | 0.398 |
| Water | | 3.753 | 3.753 | 3.753 | 3.753 | 3.753 | 3.93 |
| 3. A/B Weight Ratio* | | 0.577 | 0.615 | 0.654 | 0.692 | 0.731 | 0.713 |

*As used herein the A/B weight ratio is the weight ratio of the polyisocyanate composition to isocyanate reactive composition.

The physical characteristics of the products were determined according to the protocol described in ASTM 3574. The flammability test was conducted according to the protocol in FMVSS 302. The physical characteristics of each of the foams is tabulated hereinbelow

| | Ex. 1 | Ex. 2 | Ex. 3 | Ex. 4 | Ex. 5 | Ex. 6 |
|---|---|---|---|---|---|---|
| Cream Time, Sec. | 3 | 4 | 4 | 4 | 4 | 3 |
| Gel Time, Sec | 24 | 24 | 25 | 27 | 25 | 21 |
| End of Rise, Sec. | 37 | 36 | 35 | 32 | 30 | 33 |
| Block Wt., g | 540 | 537 | 538 | 541 | 539 | 539 |
| Core Density, Kg/m$^3$ | 36.3 | 36.1 | 36.8 | — | 35.4 | — |
| 50% ILD, N | 130 | 152 | 202 | 230 | 271 | — |
| Tensile, kPa | 96 | 99 | 123 | 135 | 147 | — |
| Elongation, % | 131 | 120 | 122 | 119 | 106 | — |
| Tear, N/M | 179 | 171 | 224 | 222 | 242 | — |
| 50% C.S., % d | 16.1 | 16.6 | 18.6 | 18.8 | 17.5 | — |
| 75% C.S., % d | 13.8 | 13.7 | 15.4 | 14.2 | 14.7 | — |
| 50% HACS, % d | 18.8 | 21.2 | 22.7 | 24.1 | 24.0 | — |
| 75% HACS, % d | 18.0 | 17.7 | 20.3 | 22.4 | 23.3 | — |
| Ball Rebound, % | 55 | 54 | 56 | 54 | 55 | — |
| Burn Rate, mm/min | SE | SE | SE | SE | SE | — |

-continued

| | Ex. 1 | Ex. 2 | Ex. 3 | Ex. 4 | Ex. 5 | Ex. 6 |
|---|---|---|---|---|---|---|
| (FMVSS302) ISO POUNDING: (80,000 cycles) | | | | | | |
| Thickness Loss, % | 0.98 | 1.46 | 2.87 | 3.33 | 2.44 | |
| 40% ILD Loss, % | 11.1 | 16.2 | 20.4 | 23.4 | 23.6 | |

The formulation shown in the last column is very similar to the one in the first column, but does not use any delayed action catalyst. The gel time for this system is still greater than 20 seconds and in addition to 38×38×10 cm. blocks, an automotive bucket seat was successfully molded with this system. This is a positive indication of the ability of the system to sufficiently flow and fill the mold.

EXAMPLES 7–12

The polyurethane foams in the following examples were prepared in accordance with the procedure described in Examples 1–6.

|  |  | wt. % | | | | | |
|---|---|---|---|---|---|---|---|
| Component | | Ex. 7 | Ex. 8 | Ex. 9 | Ex. 10 | Ex. 11 | Ex. 12 |
| 1. Polyisocyanate Composition (Fn = 2.106) | | | | | | | |
| a. Prepolymer | | | | | | | |
| MI 30 | | 73 | 73 | 73 | 73 | 73 | 73 |
| Rubinol ® F 428 | | 9 | 9 | 9 | 9 | 9 | 9 |
| b. Polymeric Isocyanate | | | | | | | |
| PBA 2273 | | 18 | 18 | 18 | 18 | 18 | 18 |
| 2. Isocyanate Reactive Composition | | | | | | | |
| Rubinol ® F 428 | | 93.2 | 90.4 | 88.59 | 88.59 | 84.83 | 79.9 |
| Rubinol ® F 417 | | — | — | — | — | 4.24 | 7.9 |
| Carbowax ® PEG 600 | | — | 2.71 | 4.43 | 4.43 | 4.24 | 5.6 |
| Niax ® DEOA-LF | | 1.398 | 1.355 | 1.329 | 1.329 | 1.272 | 1.2 |
| Niax ® A-1 | | 0.196 | .0190 | 0.186 | 0.186 | 0.178 | 0.17 |

-continued

| Component | Ex. 7 | Ex. 8 | Ex. 9 | Ex. 10 | Ex. 11 | Ex. 12 |
|---|---|---|---|---|---|---|
| Dabco ® 33LV | 0.112 | 0.108 | 0.106 | 0.106 | 0.102 | 0.09 |
| Dabco ® 8800 | 0.466 | 0.587 | 0.576 | 0.576 | 0.551 | 0.65 |
| Dabco ® DMEA | — | 0.181 | 0.354 | 0.354 | 0.339 | 0.32 |
| Niax ® L. 3001 | 0.466 | 0.452 | 0.443 | 0.443 | 0.424 | 0.40 |
| Water | 4.193 | 4.066 | 3.987 | 3.987 | 3.817 | 3.73 |
| 3. A/B Weight Ratio | 0.652 | 0.646 | 0.643 | 0.683 | 0.643 | 0.651 |

Various properties of the polyurethane foam were measured and they are recorded hereinbelow:

| | Ex. #7 | Ex. #8 | Ex. #9 | Ex. #10 | Ex. #11 | Ex. #12 |
|---|---|---|---|---|---|---|
| 50% ILD, N | 266 | 209 | 194 | 241 | 218 | 202 |
| Tensile, kPa | 148 | 146 | 139 | 140 | 129 | 123 |
| Elongation % | 133 | 131 | 123 | 125 | 132 | 122 |
| Tear N/M | 289 | 228 | 235 | 253 | 240 | 224 |
| 50% C.S., % d | 20.6 | 19.8 | 19.8 | 16.6 | 17.4 | 18.6 |
| 75% C.S., % d | 19.2 | 19.4 | 20.1 | 17.1 | 21.3 | 15.4 |
| 50% HACS, % d | 23.4 | 22.4 | 23.8 | 20.5 | 21.3 | 22.7 |
| 75% HACS, % d | 24.8 | 22.7 | 23.5 | 20.7 | 20.1 | 20.3 |
| Ball Rebound % | 55 | 50 | 53 | 55 | 54 | 56 |
| Burn Rate mm/min (FMVSS302) | SE | SE | SE | SE | SE | SE |
| ISO Pounding: (80,000 cycles) | SE | SE | SE | SE | SE | SE |
| Thickness Loss % | 3.48 | 2.54 | 3.00 | 2.99 | 2.94 | 2.87 |
| 40% ILD, Loss % | 31.0 | 25.9 | 26.7 | 28.8 | 25.6 | 20.4 |

EXAMPLE 13

A polyurethane foam was prepared from the reaction system containing the following components (in wt %) in accordance with the procedure described in Examples 1–6.

| Component | | Ex. 13 |
|---|---|---|
| A. Polyisocyanate Composition | | |
| Fn = 2.08 | | wt. % |
| 1. Prepolymer MI 30 | | 77 |
| Rubinol ® F 428 | | 9 |
| 2. Polymeric Isocyanate PBA 2273 | | 14 |
| B. Isocyanate Reactive Composition | | |
| Rubinol ® F428 | | 92.06 |
| Niax ® A1 | | 0.193 |
| Dabco ® 33LV | | 0.110 |
| Dabco ® 8800 | | 0.736 |
| Niax ® DEOA-LF | | 1.841 |
| Niax ® L3001 | | 0.46 |
| Water | | 4.603 |
| C. A/B Weight Ratio | | 0.692 |

The polyurethane foam exhibited the following characteristics:

| | Example 13 |
|---|---|
| Block wt, g (38 × 38 × 10 cm) | 549 |
| 25% ILD, N | 137 |
| 50% ILD, N | 137 |
| 65% ILD, N | 391 |
| Sag Factor | 2.86 |
| Hysteresis Loss, % | 31.2 |
| Tensile, kPa | 101 |
| Elongation, % | 101 |
| Tear, N/m | 245 |
| 50% Compression Set, % d | 19.3 |
| 75% Compression Set, % d | 18.2 |
| 50% HACS, % d | 16.7 |
| 75% HACS, % d | 18.9 |
| Ball Rebound, % | 48 |

EXAMPLES 14–15

Polyurethane foams were prepared from the reaction system containing the following components (in wt. %) in accordance with the procedure described in Examples 1–6.

| Component | Ex. 14 | Ex. 15 |
|---|---|---|
| A. Polyisocyanate Composition Fn = 2.102 | | |
| | wt. % | |
| 1. Prepolymer MI 30 | 73 | 73 |
| Rubinol ® F 428 | 9 | 9 |
| 2. Polymeric Isocyanate PBA 2273 | 18 | 18 |
| B. Isocyanate Reactive Composition | | |
| Rubinol ® F428 | 92.74 | 92.06 |
| Niax ® A1 | 0.195 | 0.193 |
| Dabco ® 33LV | 0.111 | 0.110 |
| Dabco ® 8800 | 0.464 | 0.736 |
| Niax ® DEOA-LF | 1.855 | 1.841 |
| Niax ® L3001 | 0.464 | 0.460 |
| Water | 4.173 | 4.603 |
| C. A/B Weight Ratio | 0.671 | 0.754 |

The polyurethane foams exhibited the following characteristics:

| | Ex. 14 | Ex. 15 |
|---|---|---|
| Block wt, g (38 × 38 × 10 cm) | 520 | 558 |
| 25% ILD, N | 109 | 128 |
| 50% ILD, N | 205 | 238 |
| 65% ILD, N | 331 | 377 |
| Sag Factor | 3.04 | 2.95 |
| Hysteresis Loss, % | 29.0 | 29.6 |
| Tensile, kPa | 112 | 115 |
| Elongation, % | 118 | 121 |
| Tear, N/m | 234 | 263 |

-continued

|  | Ex. 14 | Ex. 15 |
|---|---|---|
| 50% Compression Set, % d | 18.0 | 18.4 |
| 75% Compression Set, % d | 17.1 | 17.4 |
| 50% HACS, % d | 23.4 | 27.0 |
| 75% HACS, % d | 20.0 | 23.0 |
| Ball Rebound, % | 55 | 55 |

Thus, as shown by the data the polyurethane foams produced from the reaction systems in the above examples exhibited excellent characteristics.

EXAMPLE 16

The procedure for preparing the polyurethane foam of Example 12 was modified by adjusting the amount of isocyanate reactive composition that mixed with the polyisocyanate composition to provide 3 polyurethane foams having NCO indices of 80, 90 and 95, respectively.

In each case, the polyurethane foam was demolded at different times from the mold to determine the minimum demold times at a chemical temperature of 100° F. The molded foam article was squeezed between a pair of rollers. If the crusher left permanent markings on the mold, then the foam was considered not cured; however if the crusher did not leave any permanent markings on the foam, then the foam was considered cured. The results are described hereinbelow:

| Polyurethane Foam NCO Index | Demold Time (In Min.) | Comments |
|---|---|---|
| 95 | 2 | little marking on surface which faded within two minutes after removal |
| 95 | 1.5 | slightly wrinkled skin, wrinkles soon disappeared |
| 90 | 3 | very little markings, which can be seen, but not felt. The markings faded within 3 minutes after removal |
| 90 | 2.5 | some markings of crusher were visible but faded within 3–4 minutes after removal |
| 80 | 2 | smooth surface |
| 80 | 1.5 | smooth surface |

In each case, the polyurethane foam was undamaged. The surfaces were smooth; although some foams may have had some markings or indentation on the surface from the rollers, these markings disappeared within a few minutes after the removal thereof from the mold. Thus, the polyurethane foams of the present invention have minimum demold times as low as 1.5 min. and at these low demold times, there is no damage to the polyurethane foam.

COMPARATIVE EXAMPLES 1–3

A one shot foam was prepared from the reaction systems indicated hereinbelow:

| Component | Comp. Ex. 1 (Fn = 2.025) | Comp. Ex. 2 (Fn = 2.025) | Comp. Ex. 3 (Fn = 2.104) |
|---|---|---|---|
| A. Polyisocyanate Composition | | | |
| | wt. % | | |
| MI 30 | 95 | 95 | 80 |
| PBA 2273 | 5 | 5 | 20 |
| B. Isocyanate Reactive Composition | | | |
| Rubinol ® F435 | — | — | 92.08 |
| Rubinol ® F428 | 92.08 | 92.08 | — |
| Niax ® Al | 0.092 | 0.092 | 0.092 |
| Dabco ® 33LV | 0.276 | 0.276 | 0.276 |
| Dabco ® 8800 | 1.105 | 1.105 | 1.105 |
| Niax ® DEOA-LF | 1.842 | 1.842 | 1.842 |
| Niax ® L3001 | 0.46 | 0.46 | 0.46 |
| Water | 4.144 | 4.144 | 4.144 |
| C. A/B Weight Ratio | 0.598 | 0.560 | 0.615 |

Various properties of the various foams are tabulated hereinbelow:

|  | Comp. Ex. 1 | Comp. Ex. 2 | Comp. Ex. 3 |
|---|---|---|---|
| Block wt, g (38 × 38 × 10 cm) | 494 | 501 | 520 |
| 25% ILD, N | 172 | 195 | 240 |
| 50% ILD, N | 318 | 327 | 416 |
| 65% ILD, N | 482 | 481 | 629 |
| Sag Factor | 2.81 | 2.47 | 2.62 |
| Hysteresis Loss, % | 34.3 | 35.9 | 36.3 |
| Tensile, kPa | 176 | 184 | 187 |
| Core Density, kg/m$^3$ | 33.0 | 33.5 | 34.4 |
| 50% CFD, kPa | 4.11 | 4.27 | 5.37 |
| Humid Age Loss, % | 4.6 | 4.0 | 7.3 |
| Elongation, % | | | |
| Heat Aged, kPa | 157 | 163 | 180 |
| Tear, N/m | 380 | 398 | 265 |
| 50% Compression Set, % d | 50.6 | 43.8 | 25.7 |
| 75% Compression Set, % d | 67.0 | 72.0 | 27.0 |
| 50% HACS, % d | 55.5 | 53.2 | 38.3 |
| 75% HACS, % d | 76.6 | 79.3 | 61.5 |
| Ball Rebound, % | — | — | — |
| Flammability (MVSS302) | SE | SE | SE |

The polyurethane foam prepared from the one shot foam had very high ILD's and were difficult to process. Compression sets (particularly humid age) for these foams were extremely high. Thus, the polyurethane foams prepared therefrom were not satisfactory.

COMPARATIVE EXAMPLES 4–5

The following polyurethane foams were prepared from the following reaction systems and exhibited the following properties

|  |  | wt. % | |
|---|---|---|---|
|  |  | Comp. Ex. 4 | Comp. Ex. 5 |
| 1. | Polyisocyanate Composition Fn = 2.186 | | |
| (a) | Prepolymer | | |
|  | MI 30 | 58.52 | 58.52 |
|  | Arcol 2580 | 12.73 | 12.73 |
| (b) | Polymeric Isocyanate | | |

-continued

|  | wt. % | |
|---|---|---|
|  | Comp. Ex. 4 | Comp. Ex. 5 |
| PBA 2273 | 28.75 | 28.75 |
| 2. Isocyanate Reactive Composition | | |
| Isocyanate | | |
| Rubinol ® F428 | 65.1 | 65.1 |
| Rubinol ® F459 | 18.6 | 18.6 |
| Rubinol ® F417 | 9.3 | 9.3 |
| Niax ® A-1 | 0.047 | 0.047 |
| Dabco ® 33LV | 0.419 | 0.419 |
| Dabco ® 8800 | 1.116 | 1.116 |
| Unilink ® 4200 | 0.465 | 0.465 |
| Dabco ® DC5043 | 0.651 | 0.651 |
| Water | 4.279 | 4.279 |
| 3. A/B Weight Ratio | 0.731 | 0.812 |
| 50% ILD, N | 192 | 245 |
| 65% ILD, N | 374 | 516 |
| Tensile, kPa | 125 | 121 |
| Elongation, % | 91 | 80 |
| Tear, N/m | 200 | 183 |
| 50% Compression Set, % d | 17.5 | 15.0 |
| 75% Compression Set, % d | 13.7 | 16.9 |
| 50% HACS, % d | 19.6 | 20.7 |
| 75% HACS, % d | 17.5 | 15.4 |
| Ball Rebound, % | 49 | 53 |
| Burn Rate, mm/min (FMVSS302) | 50 | 53 |
|  | 49 | 59 |
| ISO Pounding (80,000 cycles) | | |
| Thickness Loss, % | 3.05 | 3.08 |
| 40% ILD Loss, % | 32.4 | 30.3 |

The polyurethane foam prepared in accordance with the present invention unquestionably exhibited superior properties to that produced in Comparative Examples 4–5. The foams of the present invention had significantly higher tear strength and elongation relative to the foams prepared in Comparative Examples 4–5. A comparison of the foams produced in Examples 7 to 12 clearly shows the distinction. The elongation percentage exhibited by the foam produced in Comparative Example 4 and 5 were 91% and 80%, respectively, while that of Examples 7 to 12 were much higher (133%, 131%, 123%, 125%, 132% and 123%, respectively). Moreover, the polyurethane foam produced in accordance with the present invention exhibited superior tear strength. (The tear resistance of the foam produced in Comparative Examples 4 and 5 were 200 and 183, N/m respectively, while that of the foam produced in Examples 7 to 12 were 289, 228, 238, 253, 240 and 240, N/m, respectively).

At the same time, the polyurethane foams of the present invention exhibited good compression sets. The polyurethane foams produced by the present invention exhibited improved flow characteristics. In addition, the polyurethane foams provided fast demold (1.5 to 2.0 minutes) without becoming overly tight, unlike corresponding higher functionality isocyanate based systems. The polyurethane foams of the present invention exhibited fast demold like the so called "cream foam" system, but flow significantly better.

The above preferred embodiments and examples were given to illustrate the scope and spirit of the present invention. These embodiments and examples will make apparent to those skilled in the art other embodiments and examples. The other embodiments and examples are within the contemplation of the present invention. Therefore, the present invention should be limited only by the appended claims.

What is claimed is:

1. A flexible polyurethane foam prepared by contacting under effective reaction conditions a polyisocyanate composition with an isocyanate reactive composition in the presence of water as the sole blowing agent characterized in that
   (a) the polyisocyanate composition comprises a semi-prepolymer which is the reaction product of an excess of a base isocyanate formulation with a first polyol, wherein said first polyol is a polyoxypropylene polyol or a polyoxypropylene polyoxyethylene polyol and is present in the polyisocyanate composition in an amount ranging from 5% to less than 50% by weight thereof and has a nominal functionality of 2–4, a molecular weight ranging from about 1,000 to about 8,000 and an ethylene oxide content of about 0 to 30 weight percent, and said base isocyanate formulation comprises a mixture of diphenylmethane diisocyanate and polyphenyl polymethylene polyisocyanate, said diphenylmethane diisocyanate comprising 2,4'-MDI in an amount ranging from about 21% to about 35% by weight, 4,4'-MDI in an amount ranging from about 63% to about 79% by weight and 2,2'-MDI in an amount ranging from 0% to about 2% by weight, the functionality of the base isocyanate formulation ranging from 2.07 to 2.12, and
   (b) the isocyanate reactive composition comprises:
      (1) A second polyol which is a polyoxypropylene polyoxyethylene polyol having a nominal functionality of 2–4, a molecular weight ranging from about 2,000 to about 8,000 and an oxyethylene content of about 5% to about 30% by weight;
      (2) water in an amount ranging from about 2.5% to about 7.0% by weight relative to the weight of said second polyol;
      (3) a crosslinker of nominal functionality of 3–4 present in cross-linking effective amounts; and
      (4) a catalyst in an amount effective to catalyze the reaction of said isocyanate reactive composition and said polyisocyanate composition, wherein said polyurethane foam has a gel time ranging from about 15 second to about 45 seconds and a minimum mold residence time of about 1.5 minutes to about 3.0 minutes.

2. The polyurethane foam of claim 1 wherein the functionality of the base isocyanate ranges from 2.08 to 2.11.

3. The polyurethane foam of claim 1 wherein the 2,4'-MDI is present in the diphenylmethane diisocyanate in an amount ranging from about 25% to about 31% by weight.

4. The polyurethane foam of claim 1 wherein the first polyol is polypropylene glycol having a molecular weight ranging from about 1,000 to about 4,000.

5. The polyurethane foam of claim 1 wherein the first polyol is polyoxypropylene polyoxyethylene polyol and has an ethylene oxide content of about 10% to about 20% by weight.

6. The polyurethane foam of claim 1 wherein the first polyol has a molecular weight ranging from about 4500 to about 6500.

7. The polyurethane foam of claim 1 wherein the NCO index thereof ranges from about 75% to about 102%.

8. The polyurethane foam of claim 7 wherein the NCO index thereof ranges from about 80% to about 95%.

9. The polyurethane foam of claim 1 wherein the crosslinker has a molecular weight of about 100 to about 200 and is present in amounts of less than about 3% by weight relative to the weight of the second polyol.

10. The polyurethane foam of claim 1 wherein the weight ratio of the polyisocyanate composition relative to the isocyanate reactive composition ranges from about 4:1 to about 1:4.

11. The polyurethane foam of claim 1 wherein the polyisocyanate composition additionally comprises
 (a) a chain extender having a molecular weight ranging from about 60 to about 330,
 (b) a surfactant,
 (c) a third polyol selected from the group consisting of polyoxyethylene glycol, a diol of polyoxyethylene-polyoxypropylene, a triol of polyoxy-ethylene-polyoxypropylene and combinations thereof, wherein said third polyol has a molecular weight ranging from about 500 to about 10,000,
 (d) a dispersion of grafted organic polymer solid in the second polyol or
 (e) a mixture thereof.

12. The polyurethane foam of claim 11 wherein the dispersion of grafted organic polymer solid, the third polyol, and surfactant are all present in the isocyanate reactive composition, whereby the dispersion of grafted organic polymer solid contains up to about 5% solid and is present in amounts less than about 10% by weight relative to the weight of the second polyol, the third polyol has a molecular weight of about 600 to about 4500 and is present in amounts less than about 10% by weight relative to the weight of second polyol, the surfactant is present in amounts ranging from about 0.05% to about 3% by weight relative to the weight of the second polyol and the chain extender has a molecular weight of about 100 to about 300 and is present in amounts of less than about 5% by weight relative to the weight of the second polyol.

13. The polyurethane foam of claim 1 having a core density ranging from about 25 to about 45 Kg/m$^3$.

14. The polyurethane foam of claim 1 having a compression set of less than about 28%.

15. The polyurethane foam of claim 1 having a tear resistance of at least about 200 N/m.

16. The polyurethane foam of claim 1 having an elongation of at least 100%.

17. A process for forming a flexible polyurethane foam which comprises contacting under effective reaction conditions a polyisocyanate composition with an isocyanate reactive composition in the presence of water as the sole blowing agent, wherein
 (a) the polyisocyanate composition comprises a semi-prepolymer which is the reaction product of an excess of a base isocyanate formulation with a first polyol, wherein said first polyol is a polyoxypropylene polyol or a polyoxypropylene polyoxyethylene polyol and is present in the polyisocyanate composition in an amount ranging from about 5% to less than 50% by weight thereof and has a nominal functionality of 2–4, a molecular weight ranging from about 1,000 to about 8,000 and an ethylene oxide content of about 0 to about 30 weight percent, and said base isocyanate formulation comprises a mixture of diphenylmethane diisocyanate and polyphenyl polymethylene polyisocyanate, said diphenylmethane diisocyanate comprising 2,4'-MDI in an amount ranging from about 21% to about 35% by weight, 4,4'-MDI in an amount ranging from about 63% to about 79% by weight and 2,2'-MDI in an amount ranging from 0% to about 2% by weight, the functionality of the base isocyanate formulation ranging from 2.07 to 2.12, and
 (b) the isocyanate reactive composition comprises:
  (1) a second polyol which is a polyoxypropylene polyoxyethylene polyol having a nominal functionality of 2–4, a molecular weight ranging from about 2,000 to about 8,000 and an oxyethylene content of about 5% to 30% by weight;
  (2) water in an amount ranging from about 2.5% to about 7.0% by weight relative to the weight of the second polyol;
  (3) a cross-linker of nominal functionality of 3–4 present in cross-linking effective amounts; and
  (4) a catalyst in an amount effective to catalyze the reaction of said isocyanate reactive composition and said polyisocyanate composition, said polyurethane foam thus formed has a gel time ranging from about 15 seconds to about 45 seconds and a minimum mold residence time of about 1.5 minutes to about 3.0 minutes.

18. The process of claim 17 wherein the functionality of the base isocyanate ranges from 2.08 to 2.11.

19. The process of claim 17 wherein the 2,4'-MDI is present in the diphenylmethane diisocyanate in an amount ranging from about 25% to about 31% by weight.

20. The process according to claim 17 wherein the first polyol is polypropylene glycol having a molecular weight ranging from about 1,000 to about 4,000.

21. The process of claim 17 wherein the first polyol is polyoxypropylene polyoxyethylene polyol and has an ethylene oxide content of about 10% to about 20% by weight.

22. The process of claim 17 wherein the first polyol has a molecular weight ranging from about 4500 to about 6500.

23. The process of claim 17 wherein the weight ratio of the polyisocyanate composition relative to the weight rate of the isocyanate reactive composition ranges from about 4:1 to about 1:4.

24. The process according to claim 17 wherein the crosslinker has a nominal functionality of 3–4 and a molecular weight of about 100 to about 200 and is present in amounts of greater than about 0% and less than 3% by weight relative to the second polyol.

25. The process of claim 17 wherein the isocyanate reactive composition additionally comprises
 (a) a chain extender having a molecular weight ranging from about 60 to about 330,
 (b) a surfactant,
 (c) a third polyol selected from the group consisting of polyoxyethylene glycol, a diol of polyoxyethylene-polyoxypropylene, a triol of polyoxyethylene-polyoxypropylene and combinations thereof, wherein said third polyol has a molecular weight ranging from about 500 to about 10,000,
 (d) a dispersion of grafted organic polymer solid in the second polyol; or
 (e) a mixture thereof.

26. The process of claim 25 wherein the dispersion of grafted polymer solid, the third polyol, the surfactant, and the chain extender are all present in the isocyanate reactive composition, and the dispersion of grafted organic polymer solid contains up to 5% solid and is present in amounts less than 10% by weight relative to the weight of the second polyol, the third polyol has a molecular weight of about 600 to about 4500 and is present in amounts less than 10% by weight relative to the weight of the second polyol, the surfactant is present in amounts ranging from 0.05 to about 3% by weight of the second polyol and the chain extender has a molecular weight of about 100 to about 300 and is present in amounts less than about 5% by weight relative to the weight of the second polyol.

* * * * *